(12) United States Patent
Takeda et al.

(10) Patent No.: US 11,432,365 B2
(45) Date of Patent: Aug. 30, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Min Liu, Beijing (CN); Xiaolin Hou, Beijing (CN); Chongning Na, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 3 days.

(21) Appl. No.: 16/961,435

(22) PCT Filed: Jan. 12, 2018

(86) PCT No.: PCT/JP2018/000567
§ 371 (c)(1),
(2) Date: Jul. 10, 2020

(87) PCT Pub. No.: WO2019/138527
PCT Pub. Date: Jul. 18, 2019

(65) Prior Publication Data
US 2020/0359448 A1    Nov. 12, 2020

(51) Int. Cl.
*H04W 80/02* (2009.01)
*H04W 72/04* (2009.01)
(Continued)

(52) U.S. Cl.
CPC ........... *H04W 80/02* (2013.01); *H04L 5/0051* (2013.01); *H04L 5/0082* (2013.01);
(Continued)

(58) Field of Classification Search
CPC ............... H04W 80/02; H04W 72/042; H04W 72/0493; H04W 72/1273; H04W 72/04;
(Continued)

(56) References Cited

U.S. PATENT DOCUMENTS

2019/0141691 A1\* 5/2019 Kwon .................. H04W 72/046
2019/0141693 A1\* 5/2019 Guo ..................... H04W 72/042
(Continued)

FOREIGN PATENT DOCUMENTS

EP         3240335 A1    11/2017

OTHER PUBLICATIONS

International Search Report issued in Application No. PCT/JP2018/000567, dated Mar. 13, 2018 (3 pages).
(Continued)

*Primary Examiner* — Candal Elpenord
(74) *Attorney, Agent, or Firm* — Osha Bergman Watanabe & Burton LLP

(57) ABSTRACT

According to the present disclosure, a user terminal has a receiving section that receives a MAC (Medium Access Control) control element, which includes one or more fields that respectively correspond to one or more control resource sets, and a control section that controls receipt of a downlink control channel, which is mapped to a given resource unit in the control resource sets, based on transmission configuration indicator (TCI) states of the control resource sets, shown in the fields.

4 Claims, 12 Drawing Sheets

MAC CE FOR SPECIFYING TCI STATE

(51) Int. Cl.
  *H04W 72/12* (2009.01)
  *H04L 5/10* (2006.01)
  *H04L 5/00* (2006.01)

(52) U.S. Cl.
  CPC .............. *H04L 5/0092* (2013.01); *H04L 5/10* (2013.01); *H04W 72/042* (2013.01); *H04W 72/0493* (2013.01); *H04W 72/1273* (2013.01)

(58) Field of Classification Search
  CPC ... H04L 5/0051; H04L 5/0082; H04L 5/0092; H04L 5/10
  USPC .................................................. 370/329–330
  See application file for complete search history.

(56) References Cited

U.S. PATENT DOCUMENTS

| | | | |
|---|---|---|---|
| 2019/0215701 A1* | 7/2019 | Honglei | H04W 24/02 |
| 2020/0145937 A1 | 5/2020 | Heo et al. | |
| 2020/0221428 A1* | 7/2020 | Moon | H04B 7/024 |
| 2020/0288479 A1* | 9/2020 | Xi | H04B 7/02 |

OTHER PUBLICATIONS

Written Opinion issued in International Application No. PCT/JP2018/000567, dated Mar. 13, 2018 (4 pages).
3GPP TS 36.300 V8.12.0, Release 8; "LTE; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG-RAN WG1 Meeting #91; R1-1721366; "Remaining details of beam management;" Ericsson; Nov. 27-Dec. 1, 2017; Reno, USA (12 pages).
3GPP TS 38.321 V15.0.0 "3rd Generation Partnership Project; Technical Specification Group Radio Access Network; NR; Medium Access Control (MAC) protocol specification (Release 15)" Dec. 2017 (55 pages).
3GPP TSG-RAN WG2 #100; R2-1713533 "MAC CEs for activating an RS resource and handling corresponding TCI states" Ericsson; Reno, US; Nov. 27-Dec. 1, 2017 (5 pages).
3GPP TSG RAN WG1 Meeting #91; R1-1721571 "Summary of Beam Mgmt." Qualcomm; Reno, USA; Nov. 27-Dec. 1, 2017 (19 pages).
Extended European Search Report issued in European Application No. 18900435.1, dated Jun. 22, 2021 (10 pages).
Office Action in counterpart European Patent Application No. 18 900 435.1 dated Jan. 20, 2022 (7 pages).
Office Action in counterpart Japanese Patent Application No. 2019-564231 dated Feb. 22, 2022 (6 pages).
Office Action in counterpart Indian Patent Application No. 202037033258 dated Apr. 12, 2022 (7 pages).

* cited by examiner

MAC CE FOR SPECIFYING TCI STATE

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 13," "LTE Rel. 14," "LTE Rel. 15" or later versions, etc.) are under study.

In existing LTE systems (for example, LTE Rel. 8 to 13), a user terminal (UE (User Equipment)) controls the receipt of a downlink shared channel (for example, PDSCH (Physical Downlink Shared CHannel)) based on downlink control information (also referred to as "DCI," "DL assignment," etc.) from a radio base station. Furthermore, a user terminal controls the transmission of an uplink shared channel (for example, PUSCH (Physical Uplink Shared CHannel)) based on DCI (also referred to as "UL grant," etc.).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, NR, 5G, 5G+, or Rel. 15 and later versions) are under study to carry out communication by using beamforming (BF). In order to improve the quality of communication using BF, studies are underway to control at least one of transmission and receipt of signals by taking into account the relationship between a number of signals in terms of quasi-co-location (QCL) (QCL relationship).

Also, envisaging the above future radio communication systems, studies are underway to allow a user terminal to control the receipt of a downlink control channel (for example, PDCCH), which is mapped to a given resource unit of a control resource set (CORESET), based on the state of a transmission configuration indicator (TCI) (TCI state) that shows (includes) QCL-related information for that CORESET.

In addition, for the above future radio communication systems, studies are also underway to specify, when a number of TCI states are configured for a CORESET by higher layer signaling (for example, RRC signaling), one of the TCI states by using a MAC control element (MAC CE (Medium Access Control Control Element)).

However, when a user terminal is configured with one or more CORESETs and yet TCI states are not specified properly using MAC CEs, this might result in making the user terminal unable to properly control receiving processes for downlink control channels that correspond to each CORESET.

The present invention has been made in view of the above, and it is therefore one of objects of the present invention to provide a user terminal and a radio communication method, whereby, even when a user terminal is configured with one or more CORESETs, receiving processes for downlink control channels that correspond to each CORESET can be controlled properly.

Solution to Problem

One aspect of the present invention provides a user terminal, which has a receiving section that receives a MAC (Medium Access Control) control element, which includes one or more fields that respectively correspond to one or more control resource sets, and a control section that controls receipt of a downlink control channel, which is mapped to a given resource unit in the control resource sets, based on transmission configuration indicator (TCI) states of the control resource sets, shown in the fields.

Advantageous Effects of Invention

According to one aspect of the present invention, even when a user terminal is configured with one or more CORESETs, receiving processes for downlink control channels that correspond to each CORESET can be controlled properly.

DESCRIPTION OF EMBODIMENTS (QCL for PDSCH)

Figure 1:
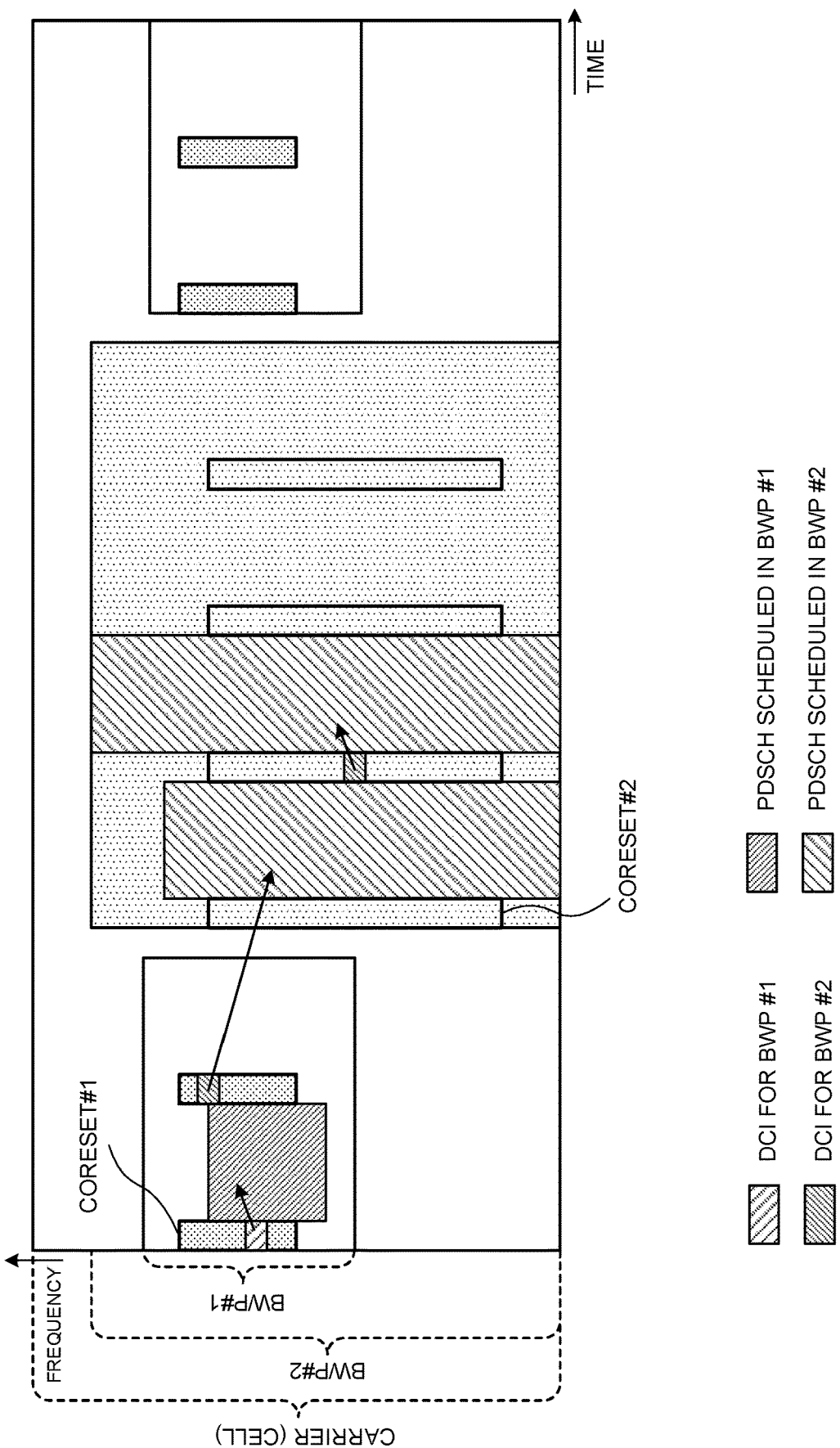
FIG. 1 is a diagram to show examples of BWPs and CORESETs configured for a user terminal.

Envisaging future radio communication systems (for example, NR, 5G, 5G+, Rel. 15 and later versions, etc.), studies are in progress to have a user terminal control the receiving processes (for example, at least one of demapping, demodulation and decoding) for a downlink shared channel (for example, PDSCH) based on information about the quasi-co-location (QCL) (QCL information) of the downlink shared channel.

Here, quasi-co-location (QCL) is an indicator to show a channel's statistical nature. For example, when one signal and another signal hold a QCL relationship, it is possible to assume that at least one of the doppler shift, the doppler spread, the average delay, the delay spread and spatial parameters (for example, spatial Rx parameter) is the same between these varying signals.

There may be one or more types of QCL (QCL types) with different parameters that can be assumed to be the same for each type. For example, four QCL types A to D may be provided with different parameters that can be assumed to be the same for each type.

QCL type A: QCL where the doppler shift, the doppler spread, the average delay and the delay spread can be assumed to be the same;

QCL type B: QCL where the doppler shift and the doppler spread can be assumed to be the same;

QCL type C: QCL where the average delay and the doppler shift can be assumed to be the same; and QCL type D: QCL where the spatial Rx parameter can be assumed to be the same.

The state of the transmission configuration indicator (TCI) (TCI state) may show (include) information about the QCL of the PDSCH (also referred to as "QCL information," "QCL information for the PDSCH," etc.). This QCL information for the PDSCH is, for example, information about the QCL between the PDSCH (or the DMRS port for the PDSCH) and a downlink reference signal (DL-RS), and may include, for example, at least one of information about the DL-RS that holds a QCL relationship (DL-RS-related information) and information to show the above QCL type (QCL-type information).

As used herein, a DMRS port refers to an antenna port for a demodulation reference signal (DMRS). A DMRS port may be a DMRS port group that includes a number of DMRS ports, and, a DMRS port as used in this specification may be interpreted as a DMRS port group.

The DL-RS-related information may include at least one of information to indicate a DL-RS that holds a QCL relationship and information to indicate the resource of this DL-RS. For example, when a user terminal is configured with a number of reference signal sets (RS sets), the DL-RS-related information may indicate, given DL-RSs, among the reference signals included in this RS set, that hold QCL relationships with the PDSCH (or with the DMRS port for the PDSCH), and the resource for these DL-RSs.

Here, a DL-RS may be at least one of synchronization signals (for example, at least one of a primary synchronization signal (PSS) and a secondary synchronization signal (SSS)), a mobility reference signal (MRS), a synchronization signal block (SSB), a channel state information-reference signal (CSI-RS), a demodulation reference signal (DMRS), a broadcast channel (PBCH (Physical Broadcast CHannel)), a beam-specific signal, and so forth, or may be a signal that is formed by enhancing and/or modifying at least one of these signals (for example, a signal that is formed by changing the density and/or the cycle of at least one of the above signals).

As described above, each TCI state can show (include) QCL information for the PDSCH. For the user terminal, one or more TCI states (QCL information for one or more PDSCHs) may be reported (configured) from a radio base station, through higher layer signaling (for example, RRC signaling). Note that the number of TCI states that may be configured for the user terminal may be limited based on the QCL type.

The DCI (DL assignment) to use for PDSCH scheduling may include a given field (TCI-state field), in which the TCI state (QCL information for PDSCH) is shown. The TCI-state field may be comprised of a given number of bits (for example, three bits). Whether or not this TCI-state field is included in DCI may be controlled by reporting (for example, higher layer signaling) from the radio base station.

For example, when DCI includes a three-bit TCI-state field, the radio base station may configure the user terminal with up to eight types of TCI states, in advance, through higher layer signaling. The value of the TCI-state field (TCI-state field value) in DCI may show one of the TCI states configured in advance through higher layer signaling.

If the user terminal is configured with more than eight types of TCI states, up to eight types of TCI states may be activated (specified) by a MAC CE. The value of the TCI state field in DCI may show one of the TCI states activated by the MAC CE.

The user terminal determines the QCL of the PDSCH (or the DMRS port for the PDSCH) based on what TCI state is shown in the DCI (QCL information for the PDSCH). For example, the user terminal controls the receiving processes (for example, the decoding process and/or the demodulation process, etc.) for the PDSCH on the assumption that the DMRS port (or the DMRS port group) for the PDSCH of the serving cell is quasi-co-located (QCL) with DL-RSs corresponding to the TCI state reported in the DCI. By this means, the PDSCH can be received with improved reliability.

(QCL for PDCCH)

Furthermore, envisaging future radio communication systems, studies are in progress to have a user terminal control the receiving processes for a downlink control channel (for example, PDCCH) based on information about the QCL (QCL information) of this downlink control channel.

The TCI state may show (include) information about the QCL of the PDCCH (also referred to as "QCL information," "QCL information for the PDCCH," etc.). The QCL information for the PDCCH is, for example, information about the QCL between the PDCCH (or the DMRS port for the PDCCH) and DL-RSs, and may include, for example, at least one of information about DL-RSs that hold QCL relationships (DL-RS-related information) and information to show the above QCL types (QCL-type information). The DL-RS-related information and the DL-RSs are as described with the QCL for the PDSCH.

Alternatively, the QCL information for the PDCCH may be information about the QCL between the control resource set (CORESET) where the PDCCH is mapped, and DL-RSs, and may include, for example, at least one of information that shows DL-RSs to hold a QCL relationship (DL-RS-related information), and information to show the above QCL types (QCL-type information).

A CORESET here is a resource domain where a PDCCH may be allocated, and may be comprised of given frequency-domain resources and time-domain resources (for example, one or two OFDM symbols, and so on). A PDCCH (or DCI) is mapped to a given resource unit in a CORESET.

This given resource unit may be, for example, at least one of a control channel element (CCE), a CCE group comprised of one or more CCEs, a resource element group (REG) comprised of one or more resource elements (REs), one or more REG bundles (REG groups), a physical resource block (PRB) and so forth.

A user terminal monitors (blind-decodes) the DCIs mapped to the given resource units in CORESETs (or the search spaces in CORESETs), and detects the DCI for the user terminal.

K ($K \geq 1$) TCI states (QCL information for K PDCCHs) per CORESET may be reported (configured) from the radio base station to the user terminal through higher layer signaling (for example, RRC signaling).

When a number of TCI states are configured for a CORESET (K>1), the radio base station may activate (specify) given TCI states (for example, one TCI state), for the user terminal, by using a MAC CE. The MAC CE may show (include), for example, at least one of the index of a CORESET where the TCI state is changed, and one TCI state to be configured for that CORESET. Also, given a CORESET where the TCI state is changed, two or more candidate TCI states may be configured in advance through higher layer signaling (for example, RRC signaling).

In addition, after a given period (for example, four slots, ten symbols, etc.) passes after the above-mentioned MAC CE (the PDSCH for communicating the MAC CE) is received, the user terminal may receive (including performing channel estimation, demodulation, and so forth) the PDCCH that is subject to monitoring in the CORESET specified by the MAC CE, by assuming the TCI state specified by the MAC CE.

Note that, when a single TCI state is configured for a CORESET (K=1), it is not necessary to report TCI states by using a MAC CE.

The user terminal determines the QCL of the PDCCH (or the DMRS port or the CORESET for the PDCCH) based on TCI states (QCL information for the PDCCH) configured or specified as described above. For example, the user terminal assumes that the DMRS port (or the CORESET) for the PDCCH is quasi-co-located (QCL) with a DL-RS corresponding to the above TCI state, and controls the receiving processes for the PDCCH (for example, the decoding process and/or the demodulation process, etc.). By this means, the PDCCH can be received with improved reliability.

Now, in the above-mentioned future radio communication systems, a user terminal might be configured with one or more CORESETs through higher layer signaling (for example, RRC signaling). For example, one or more CORESETs may be configured per serving cell (carrier, component carrier (CC), etc.) where the user terminal is configured.

Also, when one or more partial frequency bands (also referred to as "partial bands," "bandwidth parts (BWPs)" etc.) are configured within the system bandwidth (carrier bandwidth) of one serving cell, one or more CORESETs may be configured per BWP.

FIG. 1 is a diagram to show examples of BWPs and CORESETs configured for a user terminal. As shown in FIG. 1, one or more BWPs (BWPs #1 and #2 in FIG. 1) may be configured in a carrier in which a user terminal is configured.

Also, one or more CORESETs may be configured for every BWP (in FIG. 1, one CORESET per BWP).

Note that in FIG. 1, BWP #2 partially overlaps with BWP #1, but BWPs #1 and #2 may be configured in bands that do not overlap. Furthermore, in FIG. 1, one BWP is active at a given timing, but it is equally possible to activate one or more BWPs. Furthermore, although only one carrier is shown in FIG. 1, it is equally possible to configure a user terminal with two or more carriers.

In FIG. 1, a user terminal monitors the CORESET of an activated BWP (the search space in the CORESET) to detect DCI for the user terminal. This DCI may include information that shows which BWP the DCI corresponds to (BWP information). This BWP information may be, for example, a BWP index, and has only to be a given field value in DCI. The user terminal may identify the BWP where a PDSCH or a PUSCH is scheduled by the DCI, based on the BWP information in the DCI.

For example, as shown in FIG. 1, when detecting DCI including the index of BWP #1 in CORESET #1, the user terminal may receive a PDSCH scheduled in BWP #1, based on the DCI. Furthermore, when detecting DCI including the index of BWP #2 in CORESET #1, the user terminal may receive a PDSCH scheduled in BWP #2, based on the DCI. Note that DCI to schedule PUSCHs may be mapped to CORESETs #1 and/or #2.

As shown in FIG. 1, when a user terminal is configured with CORESETs #1 and #2, one or more TCI states may be configured, by higher layer signaling, for each of these CORESETs #1 and #2. In this case, the TCI state of each of CORESETs #1 and #2 may be specified by using a MAC CE. The problem, in this case, lies in how to configure the MAC CE to specify the TCI states of a number of CORESETs.

So, the present inventors have focused on the fact that, when a user terminal is configured with one or more CORESETs, configuring the MAC CE to specify the TCI states of these CORESETs properly would make it possible to control the receiving processes for PDCCHs corresponding to these CORESETs properly, and arrived at the present invention.

Now, embodiments of the present invention will be described below in detail with reference to the accompanying drawings. Note that, although the following description will describe cases in which PDSCH is demodulated based on TCI states, the present embodiment is by no means limited to this. The present embodiment can be applied to operations to use TCI states (for example, receiving processes for other signals or channels). Furthermore, in the following description, QCL may be interpreted as meaning QCL in space (spatially quasi co-located), spatial relation, and so forth.

First Example

According to a first example of the present invention, a MAC CE includes one or more fields that respectively correspond to one or more CORESETs.

To be more specific, a user terminal receives a MAC CE including one or more fields that correspond to one or more CORESETs, respectively. The user terminal may receive the MAC CE using a PDSCH.

The user terminal controls the receipt of PDCCHs, mapped to a given resource unit (for example, at least one of a CCE, a CCE group, an REG, an REG bundle and a PRB) in each CORESET, based on the CORESET's TCI state, which is shown in a corresponding field in the MAC CE.

Here, the TCI state may show (include) the above-mentioned information about the QCL between the PDCCH (or the DMRS port for the PDCCH) and DL-RSs, or the above-mentioned information about the QCL between the CORESET and DL-RSs.

Figure 2A:
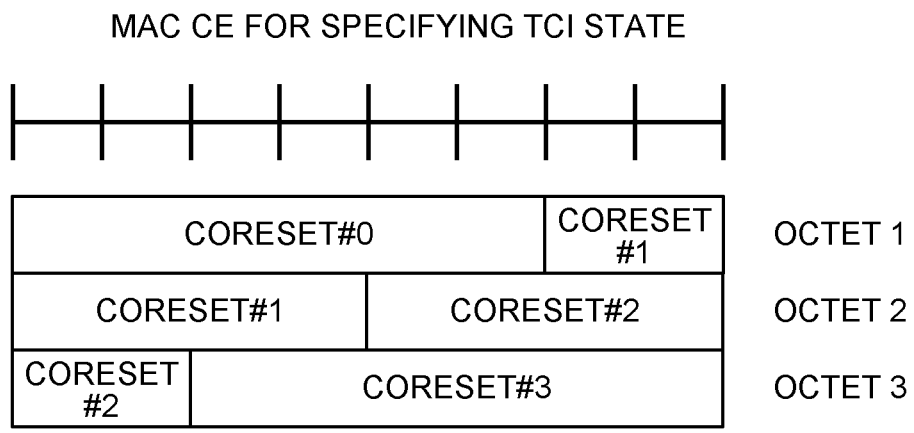
FIGS. 2A to 2C are diagrams to show examples of MAC CEs according to a first example of the present invention.
Figure 2B:
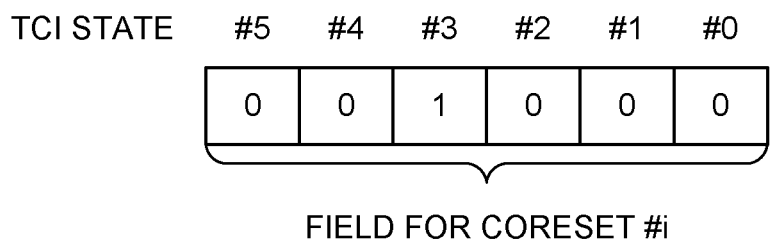
Figure 2C:
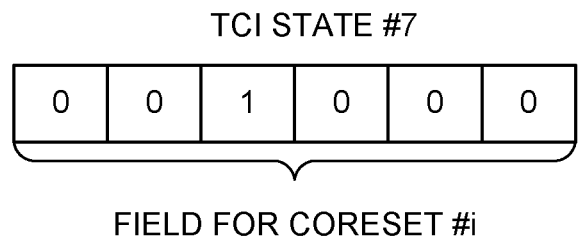

FIGS. 2A to 2C are diagrams to show examples of MAC CEs according to a first example of the present invention. As shown in FIG. 2A, each field in the MAC CE may be comprised of a number of bits (for example, six or eight bits). Each field may show one of one or more TCI states (entries) configured for a corresponding CORESET.

In FIG. 2A, the number of fields in the MAC CE may be determined based on (or may be equal to) the total number of CORESETs in one or more BWPs configured for the user terminal, or the total number of CORESETs in BWPs that are activated among the configured BWPs.

For example, in FIG. 2A, four fields, respectively corresponding to CORESETs #0 to #3, are provided in the MAC CE. Note that the MAC CE is delimited by octets (eight bits), so that, as shown in FIG. 2A, fields corresponding to the same CORESET may be arranged over a number of octets.

As shown in FIG. 2B, a number of bits to constitute a field corresponding to CORESET #i (i=0, 1, 2, . . . ) may be each a bitmap to correspond to a TCI state. As shown in FIG. 2B, when the field for CORESET #i is comprised of six bits, the six bits may correspond to six types of TCI states, respectively. In this case, the field for CORESET #i may show a TCI state corresponding to a bit that is set to "1."

For example, referring to FIG. 2B, the bit corresponding to TCI state #3 is set to "1," so that the field for CORESET #i shows this TCI state #3. Based on TCI state #3 shown in the field for this CORESET #i, the user terminal receives the PDCCH mapped to a given resource unit in this CORESET.

Note that, in FIG. 2B, it is sufficient if at least one TCI state that can be specified in the field for CORESET #i is configured by higher layer signaling. That is, in FIG. 2B, it is not necessary to configure all of TCI states #0 to #5 in advance as long as at least TCI state #2 is configured for the user terminal by higher layer signaling.

Alternatively, referring to FIG. 2C, a field that corresponds to CORESET #i (i=0, 1, 2, . . . ) may show TCI states by using a hardcode. As shown in FIG. 2C, when the field for CORESET #i is comprised of six bits, this field can specify 64 types of TCI states, namely #0 to #63, which are two to the sixth power.

For example, in FIG. 2C, the field for CORESET #i is configured to "001000" (binary number), so that this field may show TCI state #7. Note that, in FIG. 2C, too, not all types of TCI states that can be specified in the field for CORESET #i (here, TCI #0 to #63) need to be configured in advance, as long as at least one TCI state (here, TCI state #7) is configured by higher layer signaling.

When using a hardcode as shown in FIG. 2C, the field for CORESET #i can specify more types of TCI states than when using a bitmap as shown in FIG. 2B.

In the first example, each field included in the MAC CE shows one TCI state of a corresponding CORESET. Consequently, even when one or more TCI states are configured for this CORESET in advance, by higher layer signaling, the user terminal can perform receiving processes for the PDCCH mapped to a given resource unit in this CORESET based on the TCI state shown in the field in the MAC CE corresponding to this CORESET.

Second Example

A second example of the present invention is different from the first example in that a MAC CE includes specific field that shows which CORESETs' TCI states are specified in this MAC CE. Differences from the first example will be primarily described below.

Figure 3A:
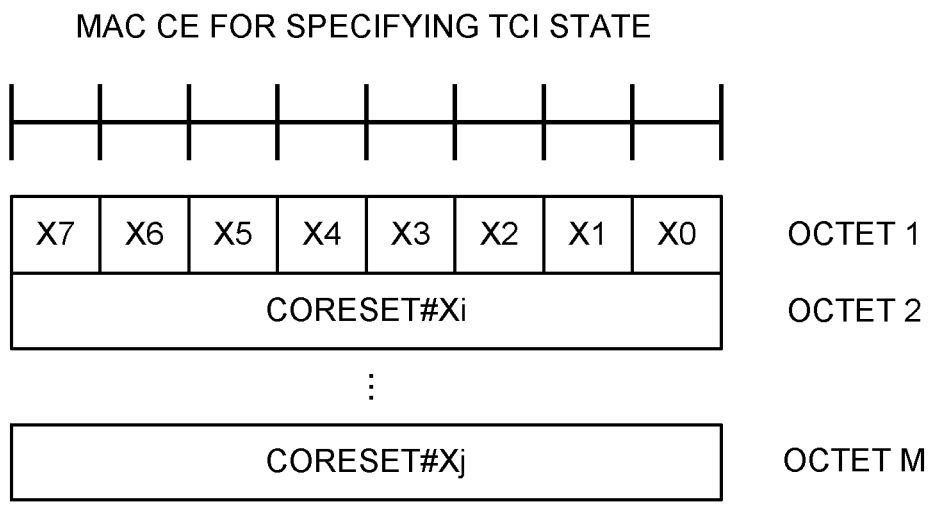
FIGS. 3A and 3B are diagrams to show examples of MAC CEs according to a second example of the present invention.

FIG. 3 are diagrams to show examples of MAC CEs according to the second example of the present invention. As shown in FIG. 3A, the above specific field may be a bitmap comprised of a number of bits that correspond to a number of CORESETs (here, CORESETs #X0 to #X7).

This specific field shows that fields for CORESETs, corresponding to bits that are set to "1," are included in the MAC CE. That is, this specific field shows that the TCI states of CORESETs corresponding to bits that are set to "1" are specified in the MAC CE.

In FIG. 3A, the number of fields that are included in the MAC CE and show TCI states may be determined based on (or may be equal to) the number of bits that are set to "1" in the specific field.

Figure 3B:
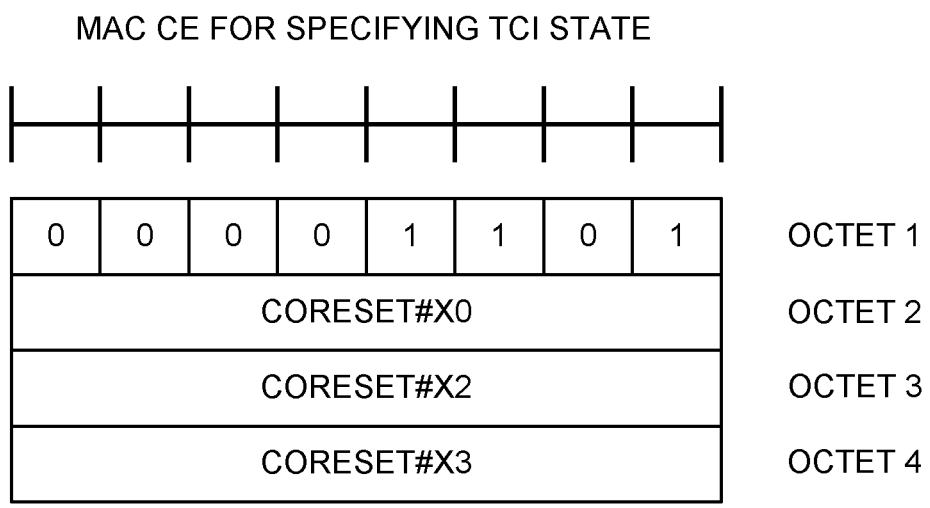

For example, in FIG. 3B, the bits that correspond to CORESETs #X0, #X2 and #X3 in the specific field of the MAC CE are set to "1." Therefore, the MAC CE shown in FIG. 3B may include three fields corresponding to CORESETs #X0, #X2 and #X3, respectively. Each field shows the corresponding CORESET's TCI states, as described in the first example (see FIGS. 2B and 2C).

Furthermore, the number M of octets to constitute the MAC CE may be determined based on at least one of the number of bits that are set to "1" in the specific field, the number of bits in fields in which the TCI states of CORESETs are shown, and the number of bits in the specific field.

For example, in FIG. 3B, each field that shows the TCI states of a CORESET is comprised of eight bits, and, given that the number of bits that are set to "1" in the above specific field is three while the specific field is comprised of eight bits, the number M of octets to constitute the MAC CE may be four.

Note that FIGS. 3A and 3B illustrate cases in which the fields to show the TCI states of CORESETs are each comprised of eight bits, but the number of bits to constitute these fields is not limited to eight.

In the second example, a specific field in a MAC CE shows which CORESETs' TCI states are specified in this MAC CE. Consequently, even when a user terminal is configured with one or more CORESETs, it is possible to properly identify which CORESETs' TCI states are specified.

Note that, according to the second example, the above specific field may be (i) a bitmap to correspond to configured CORESETs, regardless of the number of TCI states configured for each CORESET, (ii) a bitmap to correspond to all the CORESETs where one or more TCI states are configured, and (iii) a bitmap to correspond to all the CORESETs where two or more TCI states are configured. In this field, only in the CORESETs where two or more TCI states are configured are the corresponding bits set to "1," so that the overhead can be reduced in the order of (ii) than in (i), and (iii) than in (ii).

Third Example

A third example of the present invention is different from the second example in that a MAC CE includes specific field that shows the BWPs, with which CORESETs, the TCI states of which are specified in this MAC CE, are associated. Differences from the first and second examples will be primarily described below.

Figure 4A:
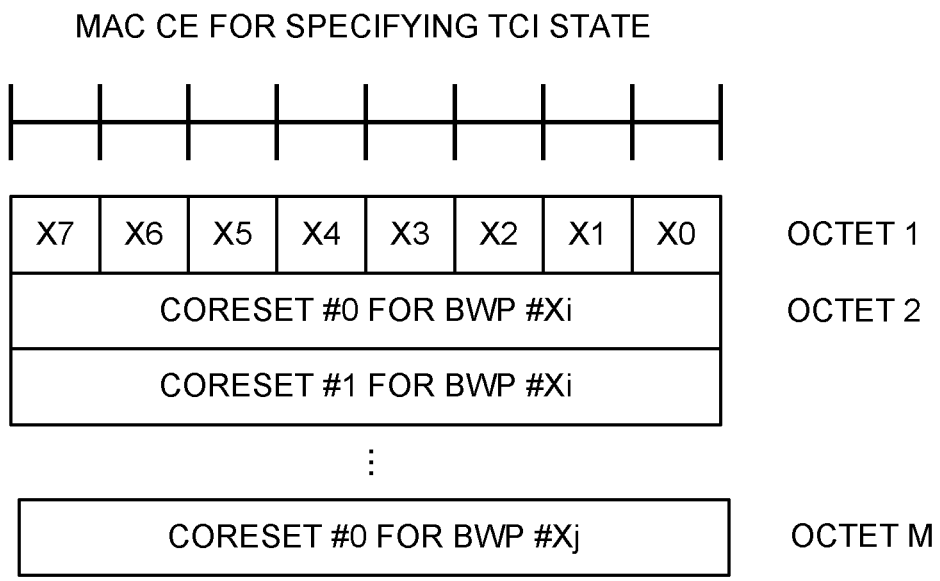
FIGS. 4A and 4B are diagrams to show examples of MAC CEs according to a third example of the present invention.

FIG. 4 are diagrams to show examples of MAC CEs according to the third example of the present invention. As shown in FIG. 4A, the above specific field may be a bitmap comprised of a number of bits that correspond to a number of BWPs (here, BWPs #X0 to #X7).

This specific field shows that fields for one or more CORESETs, corresponding to bits that are set to "1" and configured in BWPs, are included in the MAC CE. That is, this specific field shows that the TCI states of CORESETs, corresponding to bits that are set to "1" and associated with BWPs, are specified in the MAC CE.

Here, CORESETs that are associated with a BWP may be one or more CORESETs configured by higher layer signaling for the BWP, or may be CORESETs that are activated, among the configured CORESETs.

In FIG. 4A, the number of fields that are included in the MAC CE and show TCI states may be determined based on the number of bits that are set to "1" in the specific field, and the number of CORESETs associated with the BWPs corresponding to the bits.

Figure 4B:
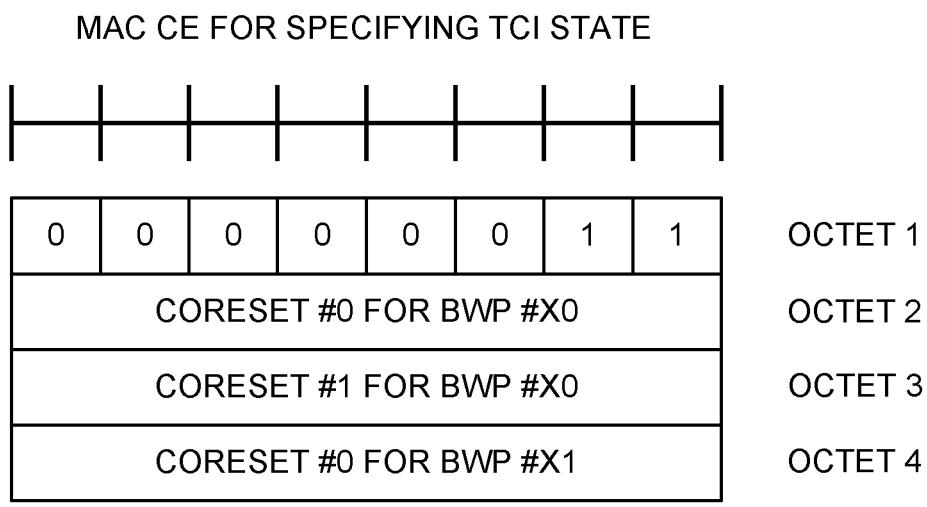

For example, in FIG. 4B, the bits that correspond to BWPs #X0 and #X1 in the specific field of the MAC CE are set to "1." Consequently, the MAC CE shown in FIG. 4B may include two fields that correspond to CORESET #0 and #1 associated with BWP #X0, and one field that corresponds to CORESET #0 associated with BWP #X1. Each field shows the corresponding CORESET's TCI states, as described in the first example (see FIGS. 2B and 2C).

Furthermore, the number M of octets to constitute the MAC CE may be determined based on at least one of the total number of CORESETs, corresponding to bits set to "1" and associated with BWPs in a specific field, the number of bits in fields, in which TCI states are shown, and the number of bits in the specific field.

For example, in FIG. 4B, each field that shows the TCI states of a CORESET is comprised of eight bits, and, given that the total number of CORESETs associated with BWPs #X0 and #X1, which correspond to the bits that are set to "1" in the above specific field, is three, the number M of octets to constitute the MAC CE may be four.

Note that FIGS. 4A and 4B illustrate cases in which the fields to show the TCI states of CORESETs are each comprised of eight bits, but the number of bits to constitute these fields is not limited to eight.

In the third example, a specific field in a MAC CE shows the BWPs, with which CORESETs, the TCI states of which are specified in this MAC CE, are associated. Consequently, even when a user terminal is configured with one or more BWPs, it is possible to properly identify the BWPs with which CORESETs, the TCI states of which are specified, are associated.

Fourth Example

An independent LCID (Logical Channel IDentifier) may be defined for a MAC CE that shows one or more CORESETs' TCI states.

Figure 5:
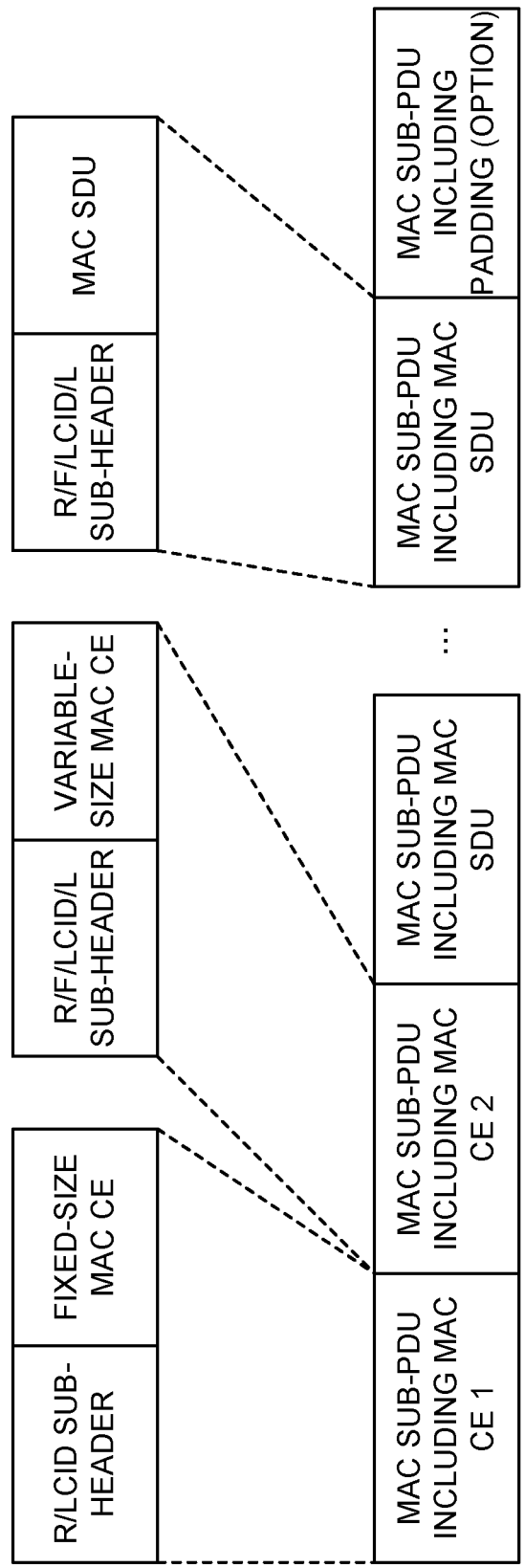
FIG. 5 is a diagram to show the configuration of a MAC PDU (Protocol Data Unit) according to a fourth example of the present invention.

FIG. 5 is a diagram to show the configuration of a MAC PDU (Protocol Data Unit). The MAC PDU includes a number of MAC sub-PDUs. A MAC sub-PDU includes one of a MAC CE, a MAC SDU (Service Data Unit), and padding. An R/LCID MAC sub-header (FIG. 6C) is attached to a fixed-size MAC CE, and an R/F/LCID/L MAC sub-header (FIG. 6A or FIG. 6B) is attached to a variable-size MAC CE and a MAC SDU.

Figure 6A:
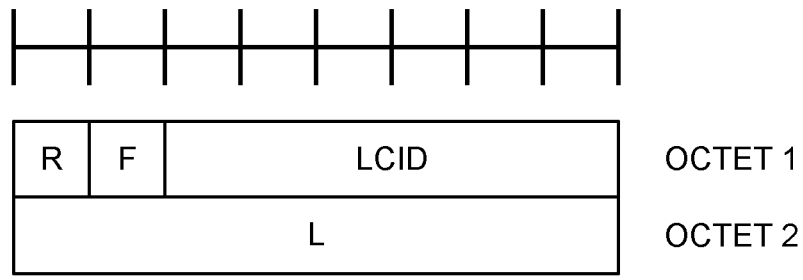
FIGS. 6A to 6C are diagrams to show examples of MAC CEs according to the fourth example.
Figure 6B:
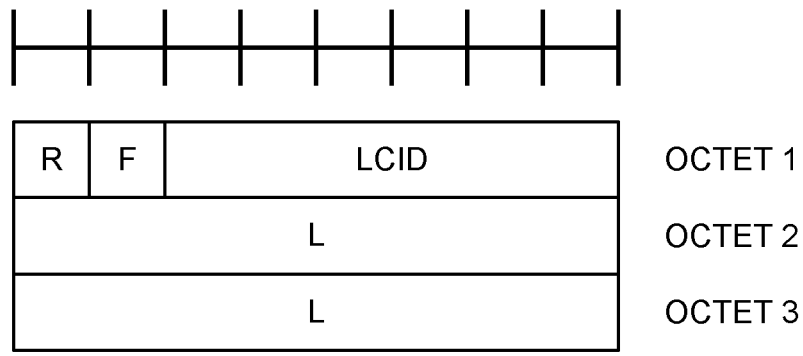
Figure 6C:
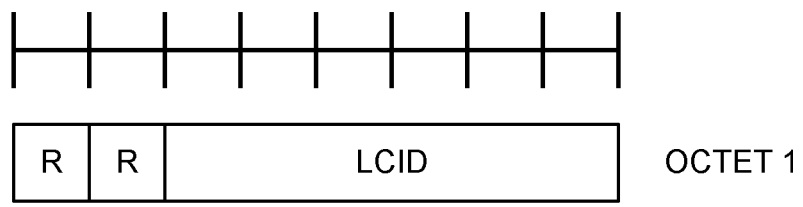

FIG. 6A shows the configuration of an R/F/LCID/L MAC sub-header having an eight-bit-length field. FIG. 6B shows the configuration of an R/F/LCID/L MAC sub-header having a sixteen-bit-length field. FIG. 6C shows the configuration of an R/LCID MAC sub-header.

L is a length field to show the length of the corresponding MAC SDU or variable-size MAC CE in bytes. F is a one-bit format field to show the size of the length field. The value "0" is an eight-bit-length field, and the value "1" is a sixteen-bit-length field. R is a reserved bit, and set to 0.

The LCID field shows the corresponding MAC SDU's logical channel instance, the type of the corresponding MAC CE, or the padding for a DL-SCH (DownLink-Shared CHannel) and a UL-SCH (UpLink-Shared CHannel). There is one LCID field for every MAC sub-header. The LCID field size may be six bits.

An individual LCID is used for a MAC CE that shows one or more CORESETs' TCI states, so that a user terminal can easily recognize that the MAC CE includes one or more CORESETs' TCI states.

(Radio Communication System)

Now, the structure of a radio communication system according to the present embodiment will be described below. In this radio communication system, communication is performed using at least one of the above examples or a combination of them.

Figure 7:
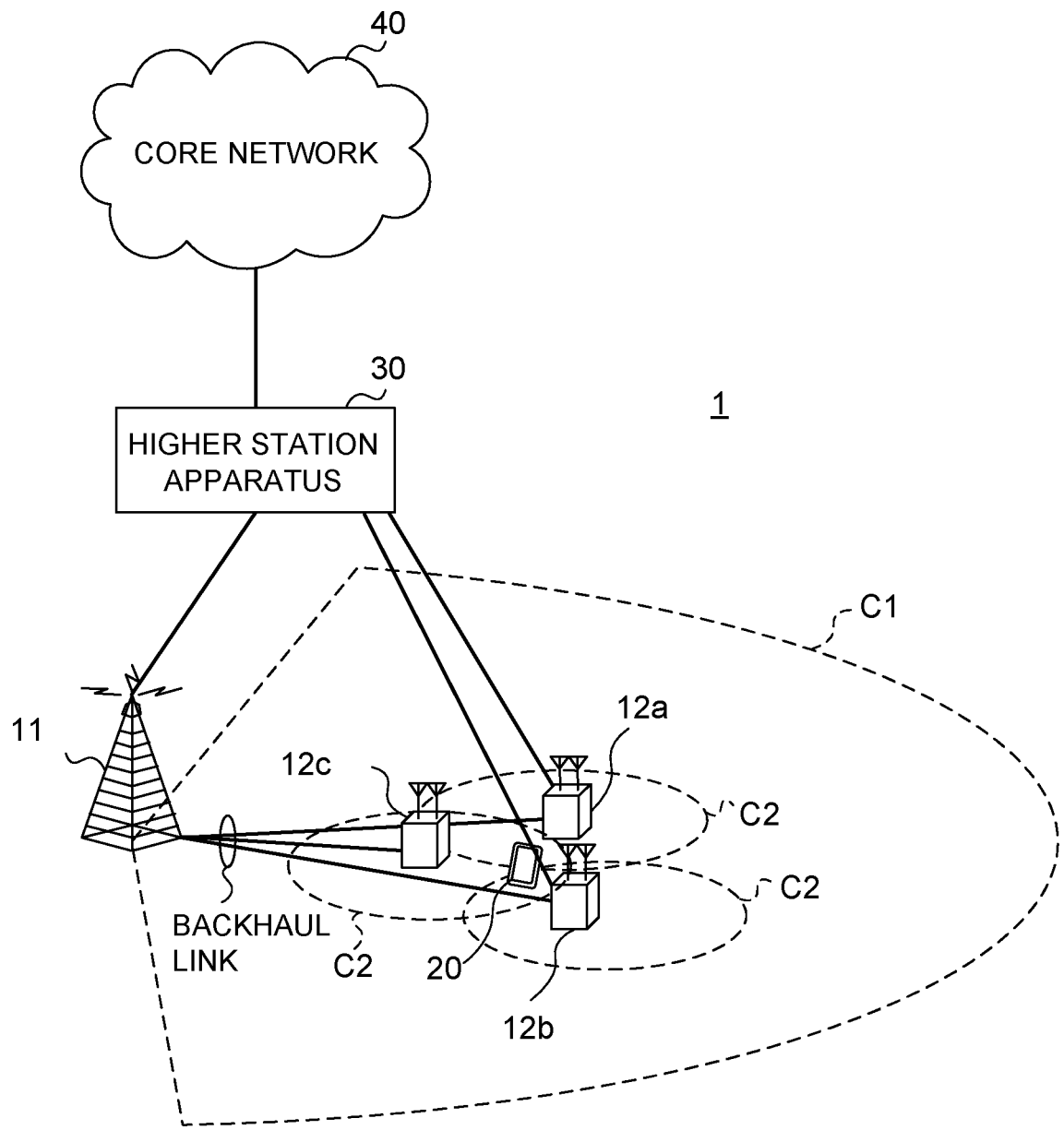
FIG. 7 is a diagram to show an exemplary schematic structure of a radio communication system according to the present embodiment.

FIG. 7 is a diagram to show an exemplary schematic structure of a radio communication system according to the present embodiment. A radio communication system 1 can adopt carrier aggregation (CA) and/or dual connectivity (DC) to group a number of fundamental frequency blocks (component carriers) into one, where the LTE system bandwidth (for example, 20 MHz) constitutes one unit.

Note that the radio communication system 1 may be referred to as "LTE (Long-term evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement and number of cells and user terminals 20 and so forth are not limited to those illustrated in the drawings.

The user terminals 20 can connect with both the radio base station 11 and the radio base stations 12. The user terminals 20 might use the macro cell C1 and the small cells C2 at the same time by means of CA or DC. Furthermore, the user terminals 20 may apply CA or DC using a number of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplex (TDD) and/or frequency division duplex (FDD), in each cell. Furthermore, in each cell (carrier), a single numerology may be used, or a number of different numerologies may be used.

A numerology may refer to a communication parameter that is applied to transmission and/or receipt of a given signal and/or channel, and represent at least one of the subcarrier spacing, the bandwidth, the duration of symbols, the length of cyclic prefixes, the duration of subframes, the length of TTIs, the number of symbols per TTI, the radio frame configuration, the filtering process, the windowing process, and so on.

The radio base station 11 and a radio base station 12 (or two radio base stations 12) may be connected with each other by cables (for example, by optical fiber, which is in compliance with the CPRI (Common Public Radio Interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but these are by no means limiting. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations each having a local coverage, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

The user terminals 20 are terminals that support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a number of narrow frequency bandwidths (subcarriers) and mapping data to each subcarrier. SC-FDMA is a single-carrier communication scheme to mitigate interference between terminals by dividing the system bandwidth into bands that are each formed with one or contiguous resource blocks, per terminal, and allowing a number of terminals to use mutually different bands. Note that the uplink and downlink radio access schemes are not limited to the combinations of these, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The L1/L2 control channels include at least one of DL control channels (such as a PDCCH (Physical Downlink Control CHannel) and/or an EPDCCH (Enhanced Physical Downlink Control CHannel)), a PCFICH (Physical Control Format Indicator CHannel), and a PHICH (Physical Hybrid-ARQ Indicator CHannel). Downlink control information (DCI), which includes PDSCH and/or PUSCH scheduling information and so on, is communicated by the PDCCH.

Note that scheduling information may be reported in DCI. For example, the DCI to schedule receipt of DL data may be referred to as "DL assignment," and the DCI to schedule transmission of UL data may also be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

<Radio Base Station>

Figure 8:
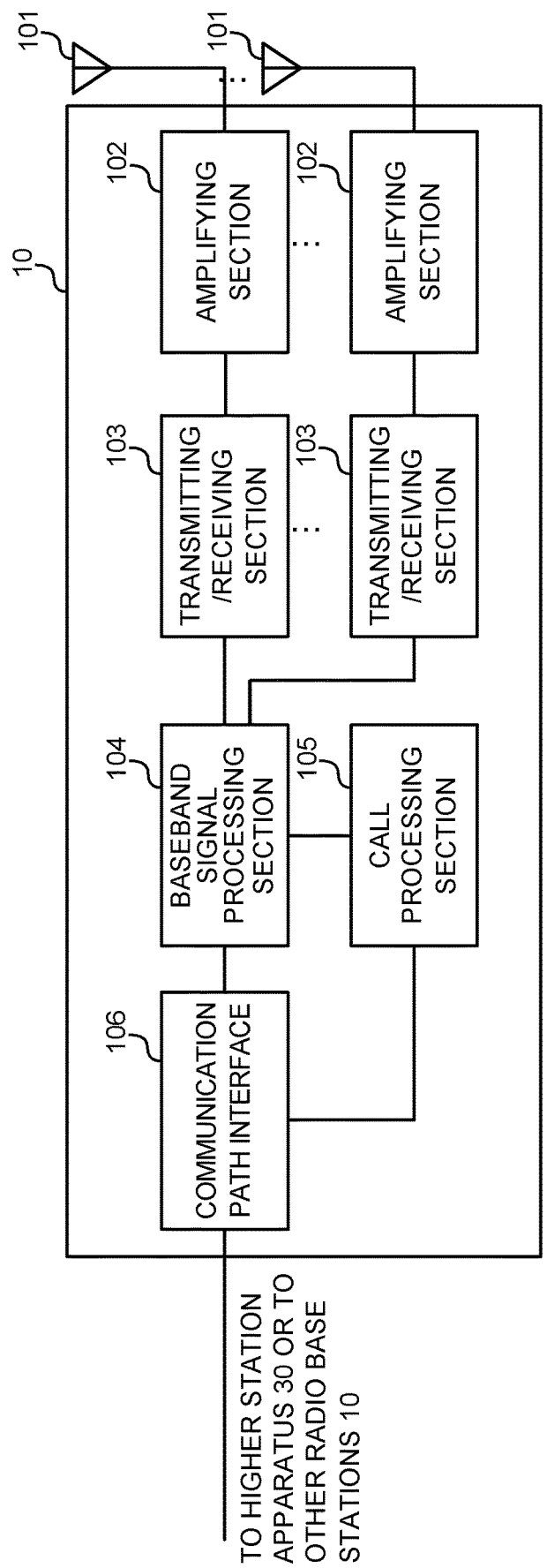
FIG. 8 is a diagram to show an exemplary overall structure of a radio base station according to the present embodiment.

FIG. 8 is a diagram to show an exemplary overall structure of a radio base station according to the present embodiment. A radio base station 10 has a number of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30, to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up, releasing and so on) for communication channels, manages the state of the radio base station 10, and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section where analog beamforming takes place. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas. In addition, the transmitting/receiving sections 103 are designed so that single-BF or multiple-BF operations can be used.

The transmitting/receiving sections 103 may transmit signals by using transmitting beams, or receive signals by using receiving beams. The transmitting/receiving sections 103 may transmit and/or receive signals by using given beams determined by the control section 301.

Furthermore, the transmitting/receiving sections 103 transmit downlink (DL) signals (including at least one of a DL data signal (downlink shared channel), a DL control signal (downlink control channel) and a DL reference signal) to the user terminal 20, and receive uplink (UL) signals (including at least one of a UL data signal, a UL control signal and a UL reference signal) from the user terminal 20.

Furthermore, the transmitting/receiving sections 103 transmit DCI for the user terminal 20 by using a downlink control channel. Also, the transmitting/receiving sections 103 transmit a MAC control element (MAC CE) by using a downlink shared channel. Also, the transmitting/receiving sections 103 may transmit information about the QCL (QCL information) (or TCI states to show (include) QCL information) of the downlink shared channel and/or the downlink control channel (CORESET).

Figure 9:
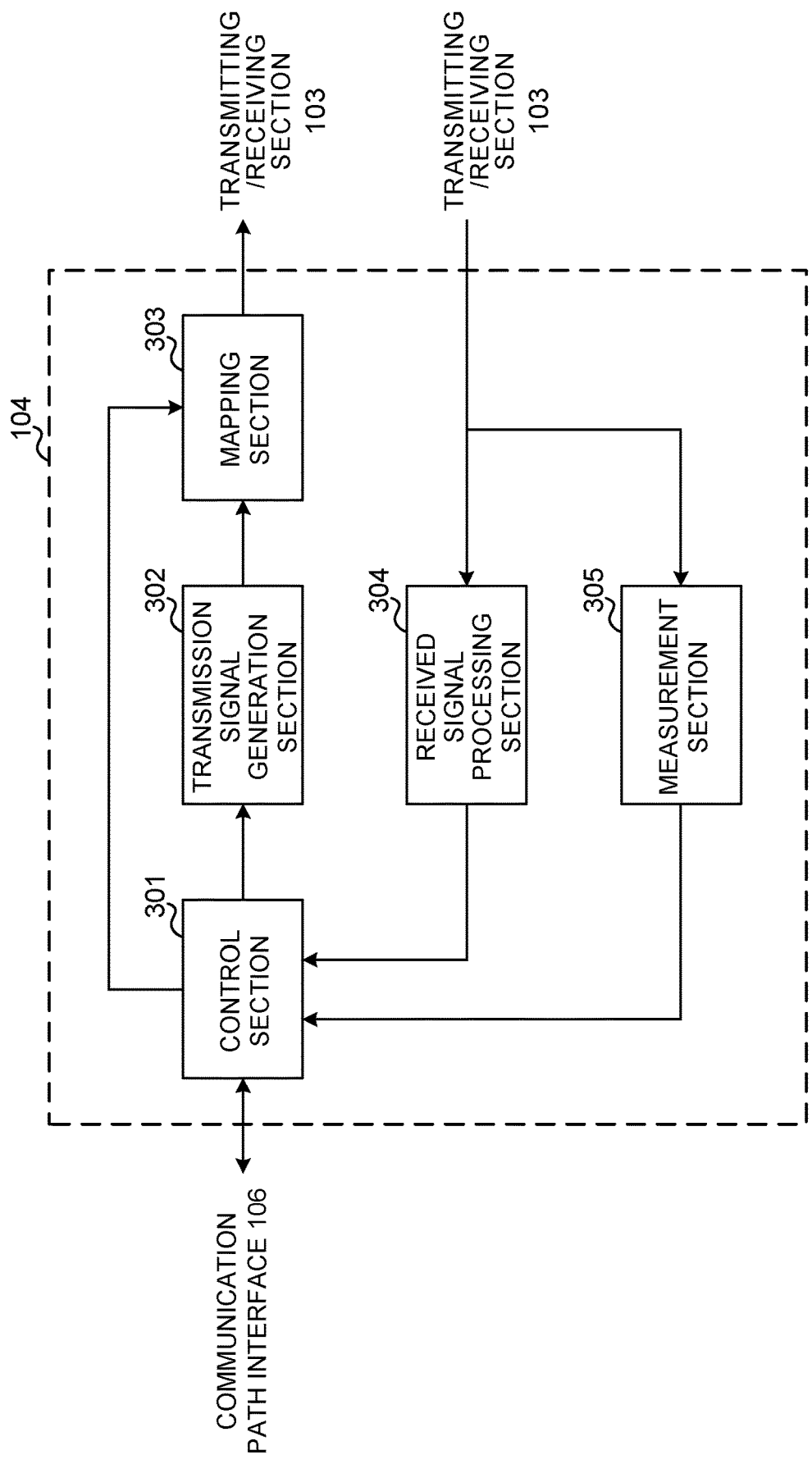
FIG. 9 is a diagram to show an exemplary functional structure of a radio base station according to the present embodiment.

FIG. 9 is a diagram to show an exemplary functional structure of a radio base station according to the present embodiment. Note that, although this example primarily shows functional blocks that pertain to characteristic parts of the present embodiment, the radio base station 10 might have other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and part or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals, and so on based on the results of deciding whether or not retransmission control is necessary for uplink data signals, and so on.

The control section 301 controls scheduling of synchronization signals (for example, PSS/SSS), downlink reference signals (for example, CRS, CSI-RS, DMRS, etc.) and the like.

The control section 301 may exert control so that transmitting beams and/or receiving beams are formed by using digital BF (for example, precoding) in the baseband signal processing section 104 and/or analog BF (for example, phase rotation) in the transmitting/receiving sections 103.

The control section 301 may control the configuration of at least one of carriers, BWPs and CORESETs for the user terminal 20. Furthermore, the control section 301 may control the configuration of one or more TCI states per CORESET for the user terminal 20.

Furthermore, the control section 301 may control the relationship of quasi-co-location (QCL) among a plurality of signals, and may control at least one of the setting, generation and transmission of QCL-related information (TCI states). To be more specific, the control section 301 may control the QCL relationship between a downlink control channel (PDCCH or CORESET) and a downlink reference signal. Furthermore, the control section 301 may control the mapping of a downlink control channel to a given resource unit in a CORESET, and the transmission of this downlink control channel.

Furthermore, the control section 301 may control at least one of the generation and the transmission of a MAC control element (MAC CE), which includes one or more fields that correspond to one or more control resource sets (CORESETs), respectively (first to third examples).

Furthermore, the control section 301 may control the number of the above fields to be included in the MAC CE based on the total number of CORESETs in one or more bandwidth parts (BWPs) that are configured for the user terminal 20, or the total number of CORESETs in BWPs that are activated, among the one or more BWPs configured (first example).

Also, if the above MAC CE includes a specific field that shows which CORESETs' TCI states are specified in the MAC CE, the control section 301 may control the number of the above fields in the MAC CE based on the number of CORESETs shown in the above specific field (second example).

Furthermore, if the above MAC CE includes a specific field that shows with which BWPs the CORESETs, the TCI states of which are specified in the MAC CE, are associated, the control section 301 may control the number of the above fields in the MAC CE based on the number of CORESETs shown in the above specific field and associated with BWPs (third example).

The transmission signal generation section 302 generates downlink signals (downlink control signals, downlink data signals, downlink reference signals, and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates, modulation schemes and the like that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals is, for example, uplink signals transmitted from the user terminal 20 (uplink control signals, uplink data signals, uplink reference signals, etc.). The received signal processing section 304 can be constituted by a signal processor, a signal processing circuit or signal processing apparatus that can be described based on general understanding of the technical field to which the present invention pertains.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements, and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio), etc.), the signal strength (for example, RSSI (Received Signal Strength Indicator)), channel information (for example, CSI) and so on. The measurement results may be output to the control section 301.

<User Terminal>

Figure 10:
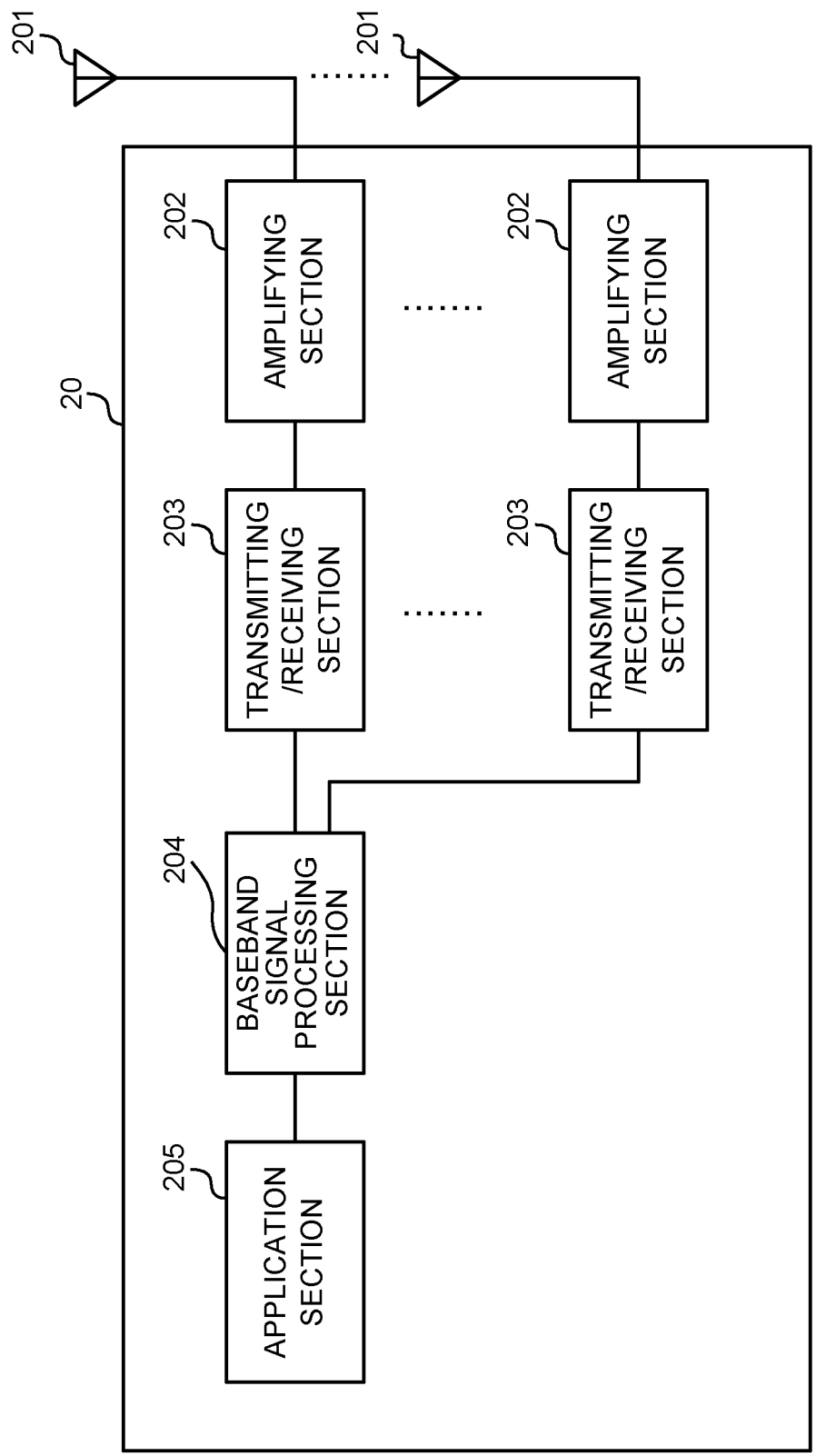
FIG. 10 is a diagram to show an exemplary overall structure of a user terminal according to the present embodiment.

FIG. 10 is a diagram to show an exemplary overall structure of a user terminal according to the present embodiment. A user terminal 20 has a number of transmitting/receiving antennas 201, amplifying sections 202, transmitting/receiving sections 203, a baseband signal processing section 204, and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process, and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203.

Baseband signals that are output from the baseband signal processing section 204 are converted into a radio frequency band in the transmitting/receiving sections 203, and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may further have an analog beamforming section where analog beamforming takes place. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas. In addition, the transmitting/receiving sections 203 are structured so that single-BF and multiple-BF can be used.

The transmitting/receiving sections 203 may transmit signals by using transmitting beams, or receive signals by using receiving beams. The transmitting/receiving sections 203 may transmit and/or receive signals by using given beams selected by the control section 401.

Also, the transmitting/receiving sections 203 receive downlink (DL) signals (including at least one of a DL data signal (downlink shared channel), a DL control signal (downlink control channel), and a DL reference signal) from the radio base station 10, and transmit uplink (UL) signals (including at least one of a UL data signal, a UL control signal, and a UL reference signal) to the radio base station 10.

Furthermore, the transmitting/receiving sections 203 receive DCI for the user terminal 20 by using a downlink control channel. Also, the transmitting/receiving sections 203 receive a MAC control element (MAC CE) by using a downlink shared channel. Also, the transmitting/receiving sections 203 may receive information about the QCL (QCL information) (or TCI states to show (include) QCL information) of the downlink shared channel and/or the downlink control channel (CORESET).

Figure 11:
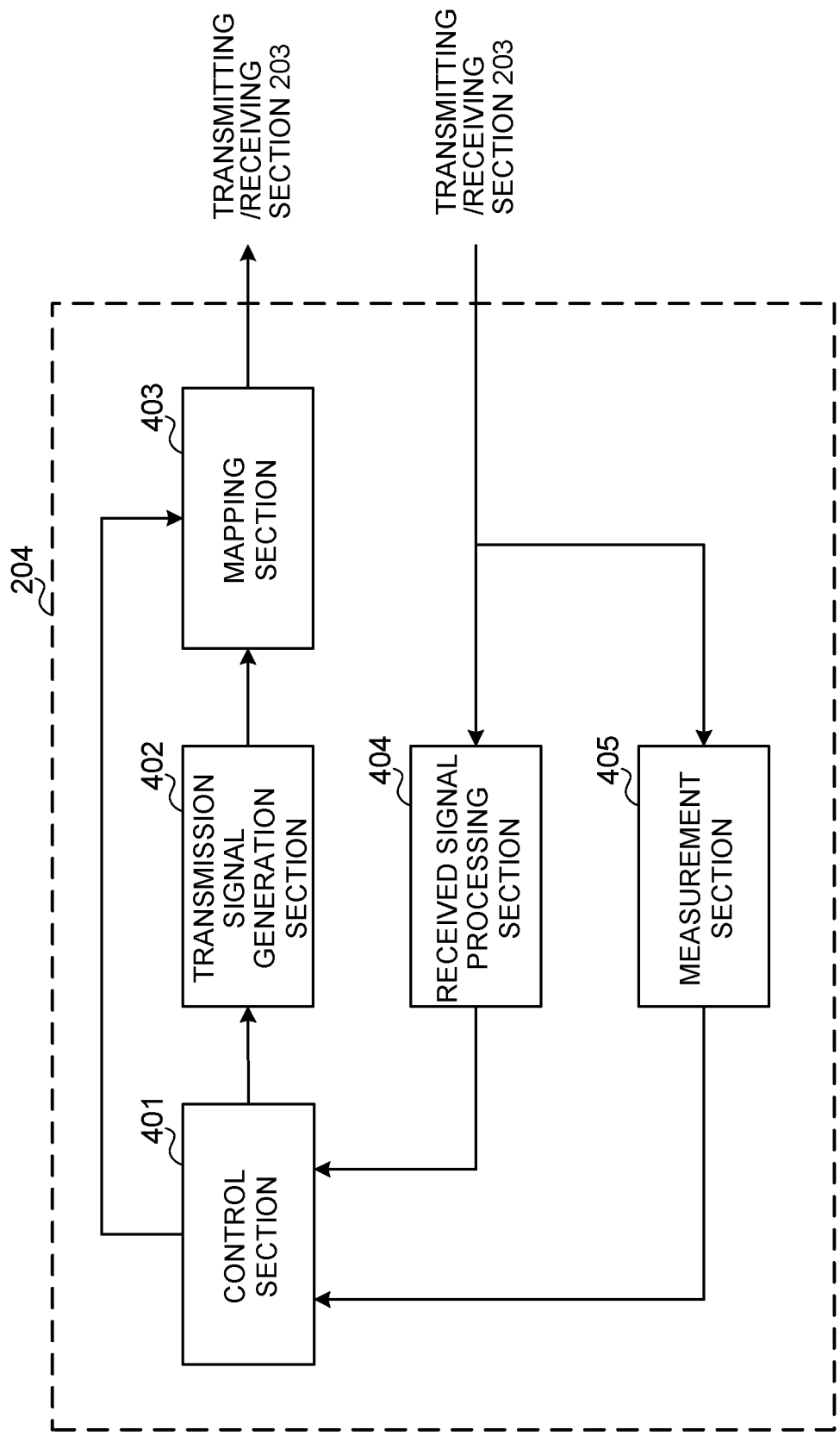
FIG. 11 is a diagram to show an exemplary functional structure of a user terminal according to the present embodiment.

FIG. 11 is a diagram to show an exemplary functional structure of a user terminal according to the present embodiment. Note that, although this example primarily shows functional blocks that pertain to characteristic parts of present embodiment, the user terminal 20 might have other functional blocks that are necessary for radio communication as well.

The baseband signal processing section 204 provided in the user terminal 20 at least has a control section 401, a transmission signal generation section 402, a mapping section 403, a received signal processing section 404, and a measurement section 405. Note that these configurations have only to be included in the user terminal 20, and part or all of these configurations may not be included in the baseband signal processing section 204.

The control section 401 controls the whole of the user terminal 20. The control section 401 can be constituted by a controller, a control circuit or control apparatus that can be described based on general understanding of the technical field to which the present invention pertains.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on results of deciding whether or not retransmission control is necessary for the downlink control signals and/or downlink data signals, and so on.

The control section 401 may exert control so that transmitting beams and/or receiving beams are formed by using digital BF (for example, precoding) in the baseband signal processing section 204 and/or by using analog BF (for example, phase rotation) in the transmitting/receiving sections 203.

Furthermore, the control section 401 may assume the relationship between a number of signals in terms of quasi-co-location (QCL), and control signal receiving processes based on QCL-related information (TCI states), accordingly. To be more specific, the control section 401 may assume a QCL relationship between a downlink control channel (PDCCH or CORESET) and a downlink reference signal, and control PDCCH receiving processes based on QCL-related information (TCI states).

Furthermore, the control section 401 may control the receipt of a MAC control element (MAC CE), which includes one or more fields that correspond to one or more control resource sets (CORESETs), respectively (first to third examples).

Furthermore, the control section 401 may control the number of the above fields to be included in the MAC CE based on the total number of CORESETs in one or more bandwidth parts (BWPs) that are configured for the user terminal 20, or the total number of CORESETs in BWPs that are activated, among the BWPs configured (first example).

Also, if the above MAC CE includes a specific field that shows which CORESETs' TCI states are specified in the MAC CE, the control section 401 may control the number of the above fields in the MAC CE based on the number of CORESETs shown in the above specific field (second example).

Furthermore, if the above MAC CE includes a specific field that shows with which BWPs the CORESETs, the TCI states of which are specified in the MAC CE, are associated, the control section 401 may control the number of the above fields in the MAC CE based on the number of CORESETs shown in the above specific field and associated with BWPs (third example).

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit, or signal generation apparatus that can be described based on general understanding of the technical field to which the present invention pertains.

For example, the transmission signal generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) for received signals that are input from the transmitting/receiving sections 203. Here, the received signals is, for example, downlink signals (downlink control signals, downlink data signals, downlink reference signals, and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present disclosure.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI), and so on. The measurement results may be output to the control section 401.

<Hardware Structure>

Note that the block diagrams that have been used to describe the present embodiment show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically-separate pieces of apparatus (by using cables and/or radio, for example) and using these multiple pieces of apparatus.

Figure 12:
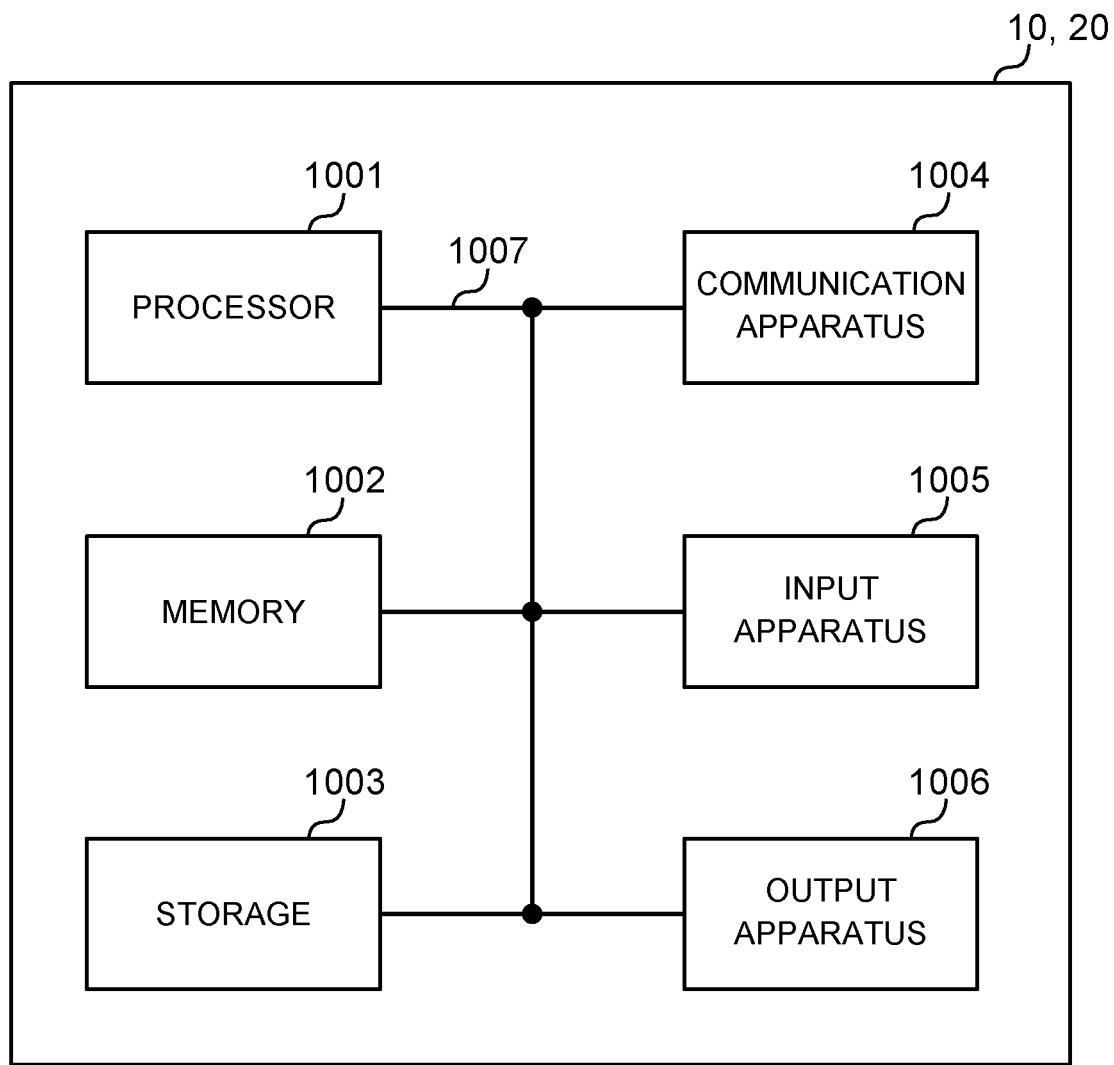
FIG. 12 is a diagram to show an exemplary hardware structure of a radio base station and a user terminal according to the present embodiment.

For example, the radio base station, user terminals, and so on according to the present embodiment may function as a computer that executes the processes of each example of the present embodiment. FIG. 12 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006, a bus 1007 and so on.

Note that, in the following description, the term "apparatus" may be replaced by "circuit," "device," "unit" and so on. The hardware structure of a radio base station 10 and a user terminal 20 may be designed to include one or a plurality of each apparatus shown in the drawings, or may be designed not to include part of the apparatus.

For example, although only one processor 1001 is shown, a plurality of processors may be provided. Furthermore, processes may be implemented with one processor, or processes may be implemented simultaneously or in sequence, or by using different techniques, on one or more processors. Note that the processor 1001 may be implemented with one or more chips.

The functions of the radio base station 10 and the user terminal 20 are implemented by, for example, allowing hardware such as the processor 1001 and the memory 1002 to read given software (programs), and allowing the processor 1001 to do calculations, control communication that involves the communication apparatus 1004, control the reading and/or writing of data in the memory 1002 and the storage 1003, and so on.

The processor 1001 may control the whole computer by, for example, running an operating system. The processor 1001 may be constituted by a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of a user terminal 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules, and so on for implementing the radio communication methods according to the present embodiment.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) or the like), a digital versatile disc, a Blu-ray (registered trademark) disk, etc.), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on, in order to implement, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from outside (for example, a keyboard, a mouse, a microphone, a switch, a button, a sensor and so on). The output apparatus 1006 is an output device for executing output to outside (for example, a display, a speaker, an LED (Light Emitting Diode) lamp, and so on). Note that the input apparatus 1005 and the output apparatus 1006 may be provided in an integrated structure (for example, a touch panel).

Furthermore, these pieces of apparatus, including the processor 1001, the memory 1002 and so on, are connected by the bus 1007, so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by these pieces of hardware. For example, the processor 1001 may be implemented with at least one of these pieces of hardware.

(Variations)

Note that the terminology used in this specification and the terminology that is needed to understand this specification may be replaced by other terms that communicate the same or similar meanings. For example, "channels" and/or "symbols" may be replaced by "signals" (or "signaling"). Also, a signal may be a message. A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency," and so on.

Furthermore, a radio frame may be comprised of one or a plurality of periods (frames) in the time domain. One or a plurality of periods (frames) that constitute a radio frame may be each referred to as a "subframe." Furthermore, a subframe may be comprised of one or a plurality of slots in the time domain. A subframe may be a fixed time duration (for example, 1 ms) not dependent on the numerology.

Furthermore, a slot may be comprised of one or a plurality of symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or a plurality of symbols in the time domain. Also, a minislot may be referred to as a "subslot."

A radio frame, a subframe, a slot, a minislot, and a symbol all refer to a unit of time in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or one minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent a TTI may be referred to as a "slot," a "minislot" and so on, instead of a "subframe."

Here, a TTI refers to the minimum time unit for scheduling in radio communication, for example. For example, in LTE systems, a radio base station schedules the radio resources (such as the frequency bandwidth and transmission power each user terminal can use) to allocate to each user terminal in TTI units. Note that the definition of TTIs is by no means limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit for scheduling may be controlled.

A TTI having a time length of 1 ms may be referred to as a "general TTI" (TTI in LTE Rel. 8 to 12), a "normal TTI," a "long TTI," a "general subframe," a "normal subframe," a "long subframe," and so on. A TTI that is shorter than a general TTI may be referred to as a "shortened TTI," a "short TTI," a "partial TTI" (or a "fractional TTI"), a "shortened subframe," a "short subframe," a "minislot," a "sub-slot," and so on.

Note that a long TTI (for example, a general TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one minislot, one subframe or one TTI in length. One TTI and one subframe each may be comprised of one or a plurality of resource blocks. Note that one or a plurality of RBs may be referred to as a "physical resource block (PRB (Physical RB))," a "subcarrier group (SCG)," a "resource element group (REG)," a "PRB pair," an "RB pair," and so on.

Furthermore, a resource block may be comprised of one or a plurality of resource elements (REs). For example, one RE may be a radio resource domain of one subcarrier and one symbol.

Note that the structures of radio frames, subframes, slots, minislots, symbols, and so on described above are simply examples. For example, configurations pertaining to the number of subframes included in a radio frame, the number of slots included per subframe or radio frame, the number of minislots included in a slot, the number of symbols and RBs included in a slot or a minislot, the number of subcarriers included in an RB, the number of symbols in a TTI, the length of symbols, the length of cyclic prefix (CP), and so on can be variously changed.

Also, the information and parameters described in this specification may be represented in absolute values or in relative values with respect to given values, or may be represented using other corresponding information. For example, a radio resource may be indicated by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals, and so on may be input and/or output via a plurality of network nodes.

The information, signals, and so on that are input and/or output may be stored in a specific location (for example, in a memory), or may be managed in a control table. The information, signals, and so on to be input and/or output can be overwritten, updated, or appended. The information, signals, and so on that are output may be deleted. The information, signals, and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling, etc.), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as "RRC messages," and can be, for example, an "RRC connection setup message," "RRC connection reconfiguration message," and so on. Also, MAC signaling may be reported using, for example, MAC control elements (MAC CEs (Control Elements)).

Also, reporting of given information (for example, reporting of "being X") does not necessarily have to be sent explicitly, and can be sent in an implicit way (for example, by not reporting this piece of information, or by reporting another piece of information).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, instructions, information and so on may be transmitted and received via communication media. For example, when software is transmitted from a website, a server or other remote sources by using wired technologies (coaxial cables, optical fiber cables, twisted-pair cables, digital subscriber lines (DSL) and so on), and/or wireless technologies (infrared radiation, microwaves, and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)," "user terminal," "user equipment (UE)," and "terminal" may be used interchangeably.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, the examples/embodiments of the present disclosure may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or a plurality of network nodes with base stations, it is clear that various operations that are performed to communicate with terminals can be performed by base stations, one or more network nodes (for example, MMEs (Mobility Management Entities), S-GWs (Serving-Gateways) and so on may be possible, but these are not limiting) other than base stations, or combinations of these.

The examples/embodiments illustrated in this specification may be used individually or in combinations, which may be switched depending on the mode of implementation. The order of processes, sequences, flowcharts, and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to systems that use LTE (Long-term evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), other adequate radio communication methods, and/or next-generation systems that are enhanced based on these.

The phrase "based on" as used in this specification does not mean "based only on" unless otherwise specified. In other words, the phrase "based on" means both "based only on" and "based at least on."

Reference to elements with designations such as "first," "second," and so on as used herein does not generally limit the number/quantity or order of these elements. These designations are used herein only for convenience, as a method for distinguishing between two or more elements. It follows that reference to the first and second elements does not imply that only two elements may be employed, or that the first element must precede the second element in some way.

The terms "judging" and "determining" as used herein may encompass a wide variety of actions. For example, "judging" and "determining" as used herein may be interpreted to mean making judgements and determinations related to calculating, computing, processing, deriving, investigating, looking up (for example, searching a table, a database, or some other data structure), ascertaining, and so on. Furthermore, "judging" and "determining" as used in the present disclosure may be interpreted as meaning making judgements and determinations related to receiving (for example, receiving information), transmitting (for example, transmitting information), inputting, outputting, accessing (for example, accessing data in a memory) and so on. In addition, "judging" and "determining" as used in the present disclosure may be interpreted as meaning making judgements and determinations related to resolving, selecting, choosing, establishing, comparing, and so on. In other words, "judging" and "determining" as used in the present disclosure may be interpreted as meaning making judgements and determinations with regard to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be interpreted as "access."

As used herein, when two elements are connected, these elements may be considered "connected" or "coupled" to each other by using one or more electrical wires, cables, and/or printed electrical connections, and, as a number of non-limiting and non-inclusive examples, by using electromagnetic energy having wavelengths of the radio frequency region, the microwave region and/or the optical region (both visible and invisible).

In the present specification, the phrase "A and B are different" may mean "A and B are different from each other." The terms such as "leave," "coupled" and the like may be interpreted likewise.

When terms such as "including," "comprising" and variations of these are used in this specification or in claims, these terms are intended to be inclusive, in a manner similar to the way the term "having" is used. Furthermore, the term "or" as used in this specification or in claims is intended to be not an exclusive OR.

Now, although the present invention has been described in detail above, it should be obvious to a person skilled in the art that the present invention is by no means limited to the embodiments described herein. The present invention can be implemented with various corrections and in various modifications, without departing from the gist and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives a Medium Access Control (MAC) control element,
wherein the MAC control element includes a first field that indicates Bandwidth Part (BWP) in which Transmission Configuration Indicator (TCI) state of control resource set is indicated by the MAC control element, and includes one or more second fields that indicates TCI states corresponding to each of one or more control resource sets associated with one or more BWPs which is indicated by the first field, and a processor that determines, based on the first field and the one or more second fields, the TCI states corresponding to each of the one or more control resource sets associated with the one or more BWPs.

2. A radio communication method for a terminal, comprising:

receiving a Medium Access Control (MAC) control element, wherein the MAC control element includes a first field that indicates Bandwidth Part (BWP) in which Transmission Configuration Indicator (TCI) state of control resource set is indicated by the MAC control element, and includes one or more second fields that indicates TCI states corresponding to each of one or more control resource sets associated with one or more BWPs which is indicated by the first field, and determining, based on the first field and the one or more second fields, the TCI states corresponding to each of the one or more control resource sets associated with the one or more BWPs.

3. A base station comprising:

a processor that controls generation of a Medium Access Control (MAC) control element based on Transmission Configuration Indicator (TCI) states corresponding to each of one or more control resource sets associated with one or more Bandwidth Parts (BWPs), a transmitter that transmits the MAC control element, wherein the MAC control element includes a first field that indicates BWP in which TCI state of control resource set is indicated by the MAC control element, and includes one or more second fields that indicates the TCI states corresponding to each of the one or more control resource sets associated with the one or more BWPs which is indicated by the first field.

4. A system comprising a terminal and a base station, wherein:

the terminal comprises:

a receiver that receives a Medium Access Control (MAC) control element, wherein the MAC control element includes a first field that indicates Bandwidth Part (BWP) in which Transmission Configuration Indicator (TCI) state of control resource set is indicated by the MAC control element, and includes one or more second fields that indicates TCI states corresponding to each of one or more control resource sets associated with one or more BWPs which is indicated by the first field, and a processor that determines, based on the first field and the one or more second fields, the TCI states corresponding to each of the one or more control resource sets associated with the one or more BWPs, and the base station comprises:

a transmitter that transmits the MAC control element.

* * * * *